(12) United States Patent  
Martin et al.

(10) Patent No.: US 9,086,780 B2  
(45) Date of Patent: Jul. 21, 2015

(54) SYSTEM, METHOD AND COMPUTER-READABLE MEDIUM FOR VISUAL PRESENTATION OF ASPECT OF SOFTWARE PROGRAMS

(75) Inventors: Geoffrey Martin, Scotts Valley, CA (US); Christopher John Marinacci, Santa Cruz, CA (US)

(73) Assignee: DIGITAL DELIVERY NETWORKS, INC., Scotts Valley, CA (US)

( * ) Notice: Subject to any disclaimer, the term of this patent is extended or adjusted under 35 U.S.C. 154(b) by 515 days.

(21) Appl. No.: 12/287,048

(22) Filed: Oct. 3, 2008

(65) Prior Publication Data

US 2010/0088648 A1   Apr. 8, 2010

(51) Int. Cl.
G06F 3/0482 (2013.01)
G06F 3/0481 (2013.01)
G06F 3/0486 (2013.01)

(52) U.S. Cl.
CPC .......... *G06F 3/04817* (2013.01); *G06F 3/0482* (2013.01); *G06F 3/0486* (2013.01)

(58) Field of Classification Search
CPC .... G06F 3/0481; G06F 9/4443; G06F 3/0482
USPC ......... 715/710, 815, 821, 828, 840, 843, 846, 715/787, 808, 825, 779, 862
See application file for complete search history.

(56) References Cited

U.S. PATENT DOCUMENTS

| | | | | |
|---|---|---|---|---|
| 5,588,107 A * | 12/1996 | Bowden et al. | ............... | 715/828 |
| 5,671,380 A * | 9/1997 | Hidaka | ............... | 715/861 |
| 5,721,853 A * | 2/1998 | Smith | ............... | 715/803 |
| 5,742,777 A * | 4/1998 | Eick | ............... | 715/787 |
| 5,757,371 A * | 5/1998 | Oran et al. | ............... | 715/779 |
| 5,825,357 A * | 10/1998 | Malamud et al. | ............. | 715/779 |
| 5,986,654 A * | 11/1999 | Alexander et al. | ............ | 715/744 |
| 6,356,279 B1 * | 3/2002 | Halstead et al. | ............. | 345/619 |
| 6,621,532 B1 | 9/2003 | Mandt | | |
| 6,714,215 B1 | 3/2004 | Flora et al. | | |
| 6,857,105 B1 * | 2/2005 | Fox et al. | ............... | 715/825 |
| 6,918,091 B2 | 7/2005 | Leavitt et al. | | |
| 7,039,875 B2 | 5/2006 | Khalfay et al. | | |
| 7,173,619 B2 | 2/2007 | Hill et al. | | |
| 7,246,329 B1 * | 7/2007 | Miura et al. | ............... | 715/810 |
| 7,409,646 B2 | 8/2008 | VedBrat et al. | | |
| 7,490,295 B2 * | 2/2009 | Chaudhri et al. | ............ | 715/764 |
| 7,673,241 B2 * | 3/2010 | Sun et al. | ............... | 715/729 |
| 8,522,159 B2 * | 8/2013 | Kurtenbach et al. | ......... | 715/810 |
| 2005/0039144 A1 | 2/2005 | Wada et al. | | |
| 2007/0157118 A1 * | 7/2007 | Wuttke | ............... | 715/810 |
| 2008/0077873 A1 | 3/2008 | Peterson | | |

OTHER PUBLICATIONS

U.S. Appl. No. 09/423,025, filed Oct. 28, 1999, Peterson, H.L. et al

* cited by examiner

*Primary Examiner* — Andrew Tank
(74) *Attorney, Agent, or Firm* — Patrick Reilly

(57) ABSTRACT

A graphical user interface (GUI) presents a primary icon in a minimal visual area of a video display screen of a computer. Selecting the primary icon directs the computer to display a line of segments, where each segment associated with one or more software programs or electronic documents. The GUI allows a user to directly access items of visual and/or audio media by selecting one or more documents or software programs associated with a selected segment. The GUI optionally allows selected a line or segment for transmission from the computer to another computer, wherein copies one or more documents or software applications are transmitted to the second computer.

18 Claims, 14 Drawing Sheets

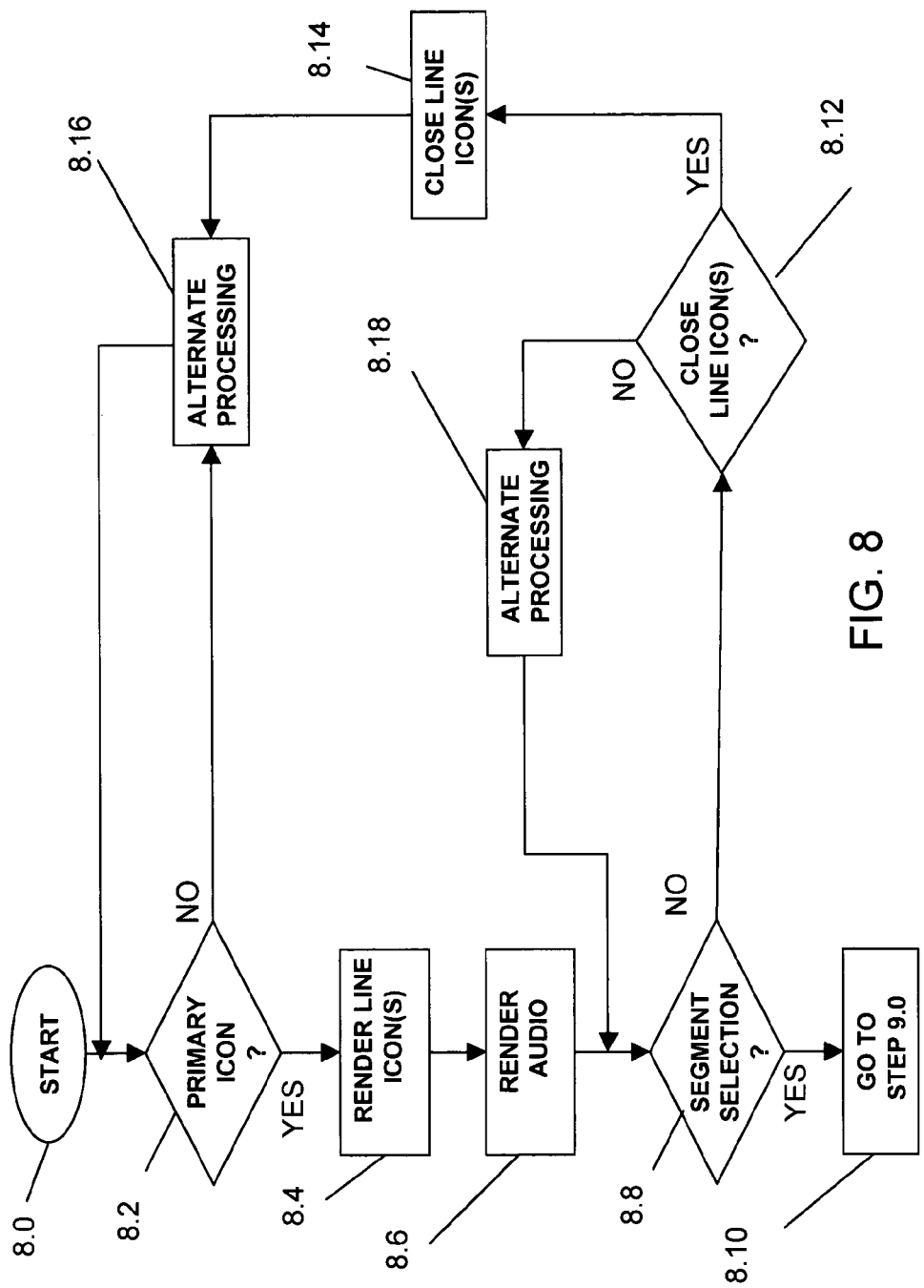

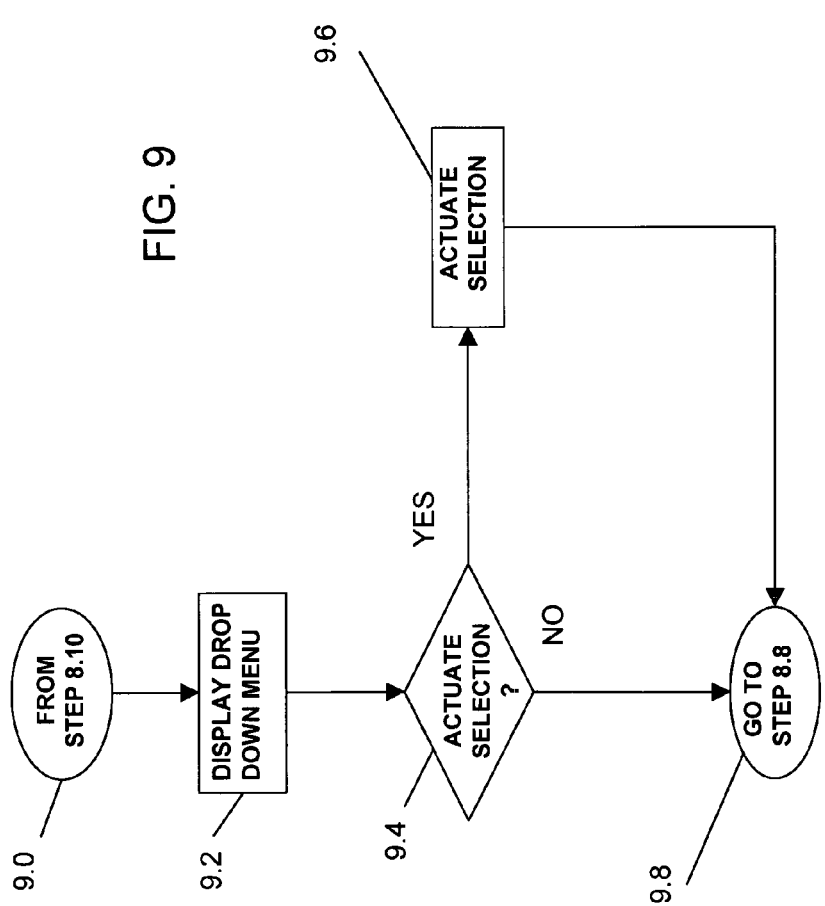

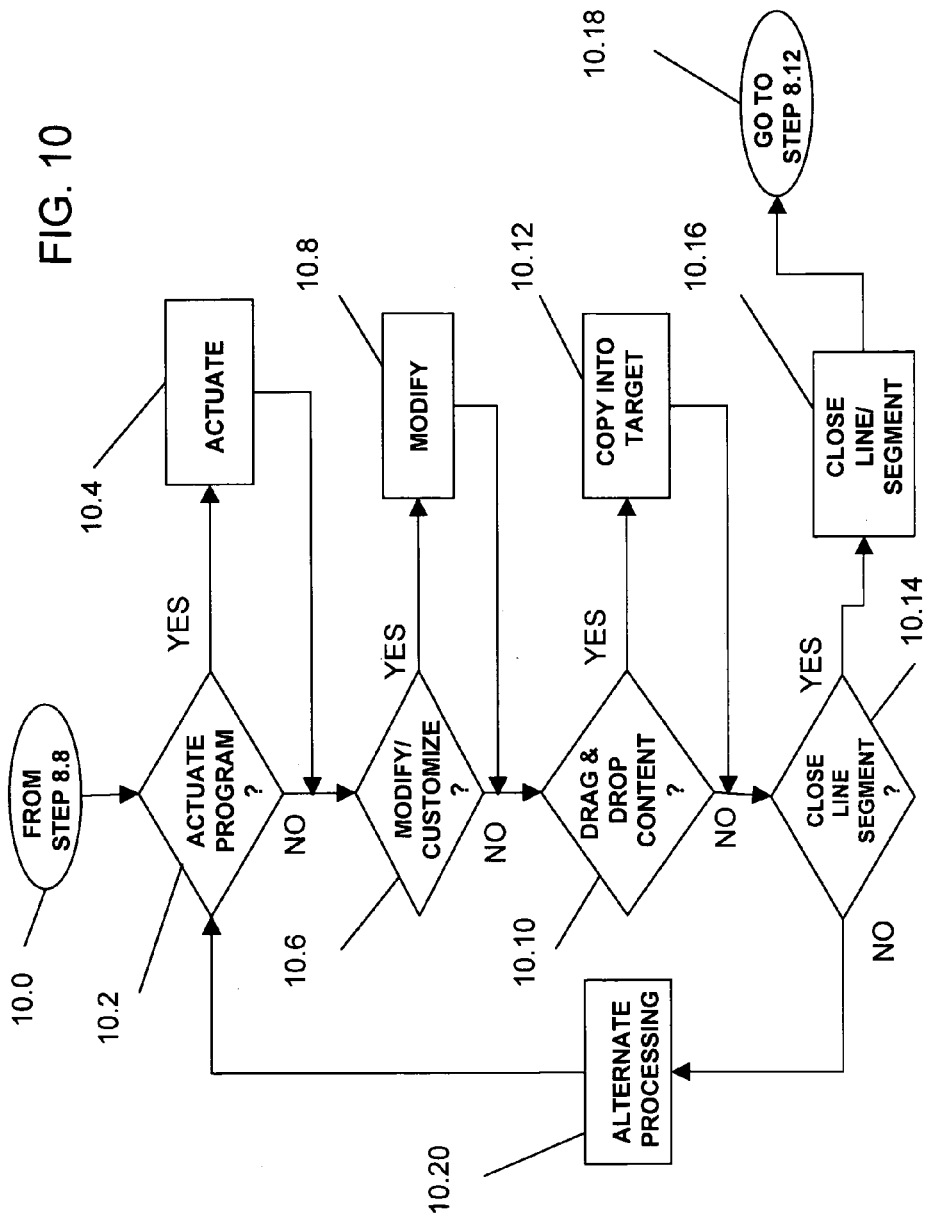

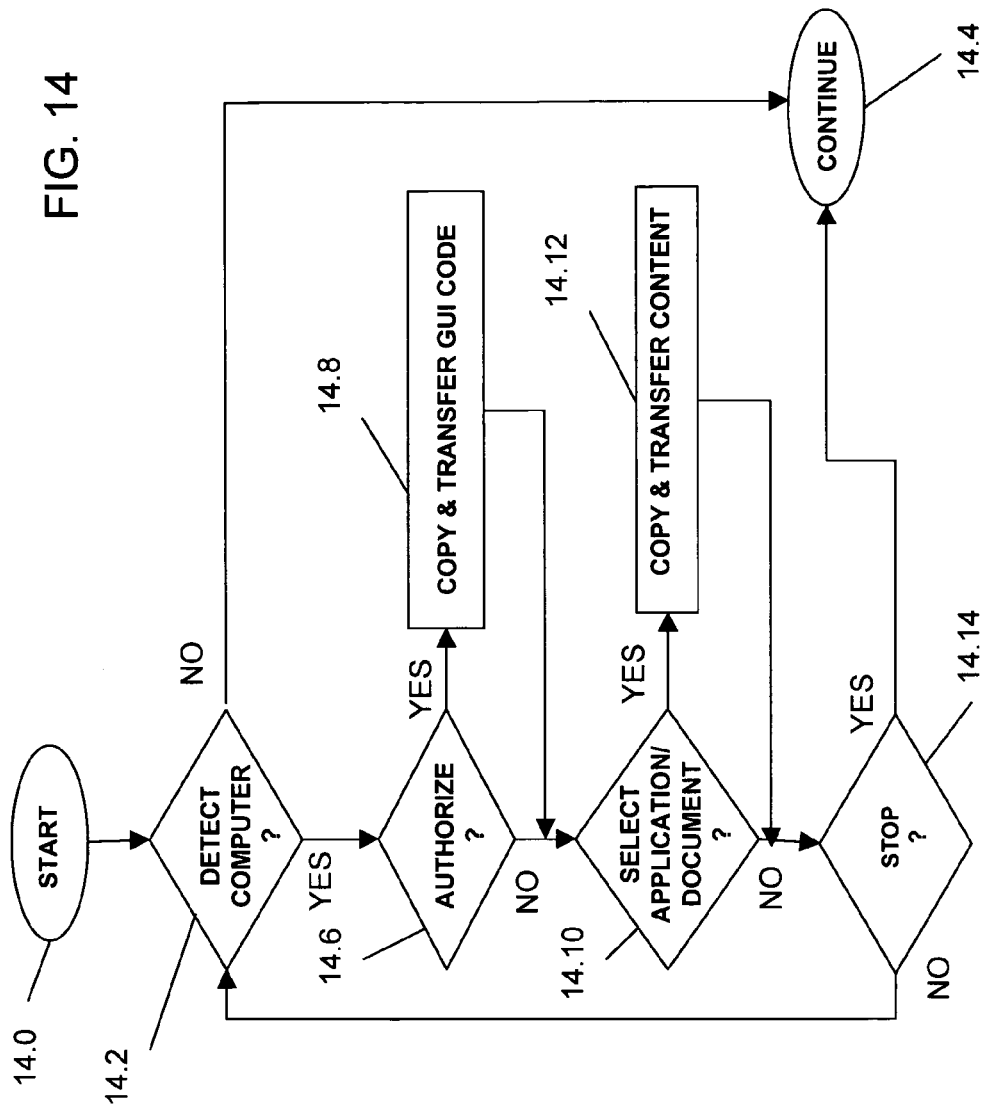

SYSTEM, METHOD AND COMPUTER-READABLE MEDIUM FOR VISUAL PRESENTATION OF ASPECT OF SOFTWARE PROGRAMS

FIELD OF THE INVENTION

The present invention relates to information technology systems that provide a visual user interface that enables a user to issue commands to an operating system or other software program. The present invention more particularly relates to graphical user interfaces.

BACKGROUND OF THE INVENTION

Information technology systems often employ visually displayed icon, widgets, and other visual representations of aspects of user interfaces. As many information technology systems, such as personal computers, often include numerous software programs, the visual desktop of a technology system can become cluttered with visual images. The prior art employs toolbars and sidebars to group icons and other visual aspects of software programs in attempts at ordering and simplifying the presentation of these visual elements. However, the user experience can be degraded by the multiplicity of separate visual elements that are perceived at system start-up and during system operation by the user.

A user interface bridges the gap between a user who seeks to control a device and the software and/or hardware that actually controls that device. The user interface for a computer is typically a software program running on the computers central processing unit (hereafter "CPU"), which responds to certain user-typed commands. As computers have increased in popularity, the quality of the user interlace has become an ever more important consideration in the development of a computer, since many of these users are not familiar with and/or comfortable with many of the typed commands that are required to operate the computer. One popular type of user interface that simplifies the operation of a computer is provided by a VAIO FS8900™ notebook computer marketed by Sony Corporation of America, of New York City, N.Y. Other prior art personal computers known in the art may comprise user interfaces integrated with or within an XP™ personal computer operating system software or a VISTA™ personal computer operating system software marketed by Microsoft Corporation of Redmond, Wash. Other popular types of user interface are include in MACINTOSH™ personal computers marketed by Apple Computer, Inc., of Cupertino, Calif.

The prior art includes significant effort to improve the visual presentation of display aspects of user interfaces, as evidenced by U.S. Pat. No. 7,409,646 (VedBrat, et al.; Aug. 5, 2008) entitled "System and method for manipulating toolbar component dimensions"; U.S. Pat. No. 7,173,619 (Hill, et al.; Feb. 6, 2007) entitled "Matching digital information flow to a human perception system"; U.S. Pat. No. 7,039,875 (Khalfay, et al.; May 2, 2006) entitled "Computer user interfaces that are generated as needed"; U.S. Pat. No. 6,918,091 (Leavitt, et al.; entitled Jul. 12, 2005) entitled "User definable interface system, method and computer program product"; U.S. Pat. No. 6,714,215 (Flora, et al.; Mar. 30, 2004) entitled "System and method for displaying media interactively on a video display device"; and U.S. Pat. No. 6,621,532 (Mandt; Sep. 16, 2003) entitled "Easy method of dragging pull-down menu items onto a toolbar"; and US Patent App. Publication Ser. No. 20050039144 (Wada, Alan, et al.; Feb. 17, 2005) entitled "Method and system of providing customizable buttons". The prior art fails, however, to visually present aspects of user interfaces on a video display screen to optimize user comfort in using an information technology system.

There is therefore a long felt need to provide systems and methods to present visual aspects of user interfaces that improve the user experience with an information technology system.

SUMMARY OF THE INVENTION

Towards this object and other objects that will be made obvious in light of this disclosure, the method of the present invention provides a method for organizing visual aspects of software programs and electronic content as displayed on a video screen of an information technology system. The term information technology system is defined herein to include electronic computers, personal computers, personal digital assistants, wireless communications enables devices and digital telephones having visual display screens.

In a first aspect of the method of the present invention, a visual selection button (hereafter "primary icon") is visually presented on a display screen of an information technology system. Positioning a cursor on top of, or proximate to, the primary icon causes an icon line to be presented on the display screen. More particularly, in certain alternate preferred embodiments of the present invention, a user can use an input device, such as a mouse, to pass a position indicator presented in the conventional form of a cursor to direct the information technology to display electronic content. The icon line includes one or more visual images that are associated with one or more software programs and/or electronic documents. A user may then use a selection device, such as a computer mouse, to position the cursor over each software program visual aspect of the icon line. Selecting a visual aspect of an icon line (hereafter "program icon") by use of the selection device directs the information technology system to launch, instantiate, relaunch, run or execute a software program and/or render or display a document associated with the selected program icon.

The primary icon may optionally be presented as a modestly sized icon having a square area less than 0.00001 square inch, or between 0.00001 square inch and 0.001 square inch, or between 0.001 and 0.02 square inch. In certain still other alternate embodiments of the method of the present invention, the primary icon may optionally be presented as a modestly sized icon having a square area less than 0.00001 square inch, or between 0.00001 square inch and 1.0 square inch The size and/or color of the primary icon may optionally be adjusted by a user of the information technology system.

In additional optional aspects of the method of the present invention, the icon line may include two or more string elements, wherein each string element of the icon line comprises a separate program icon. One or more program icons may be visually presented as a drop down menu that enables a user to select from a variety of software functionalities and/or software programs. One or more string elements may be associated with a color or color scheme, or an audio data, wherein the associated color, color scheme and/or audio file may be rendered when a string element id displayed or selected. A string element may be associated with an electronic document (hereafter "document"), such as a text document, a graphic image document, a photographic document, a video data, and/or an audio data.

Certain alternate preferred embodiments of the method of the present invention provide an information technology system configured with means to visually present a selection button; means to present a GUI string element upon selection of the selection button; and means to associate at least one application programs or document with at least one GUI string element.

Yet other alternate preferred embodiments of the method of the present invention provide a computer-readable medium comprising machine-readable instructions which when executed by a computer cause the computer to perform one or more of the steps of the method of the present invention.

The foregoing and other objects, features and advantages will be apparent from the following description of the preferred embodiment of the invention as illustrated in the accompanying drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 7,409,646 (VedBrat, et al.; Aug. 5, 2008) entitled "System and method for manipulating toolbar component dimensions"; U.S. Pat. No. 7,173,619 (Hill, et al.; Feb. 6, 2007) entitled "Matching digital information flow to a human perception system"; U.S. Pat. No. 7,039,875 (Khalfay, et al.; May 2, 2006) entitled "Computer user interfaces that are generated as needed"; U.S. Pat. No. 6,918,091 (Leavitt, et al.; entitled Jul. 12, 2005) entitled "User definable interface system, method and computer program product"; U.S. Pat. No. 6,714,215 (Flora, et al.; Mar. 30, 2004) entitled "System and method for displaying media interactively on a video display device"; and U.S. Pat. No. 6,621,532 (Mandt; Sep. 16, 2003) entitled "Easy method of dragging pull-down menu items onto a toolbar"; and US Patent App. Publication Ser. No. 20050039144 (Wada, Alan, et al.; Feb. 17, 2005) entitled "Method and system of providing customizable buttons" and United States Patent Application Publication Ser. No. 20080077873 (Peterson, Harold Lee; Mar. 27, 2008) entitled "Apparatus, method and computer-readable medium for organizing the display of visual icons associated with information technology processes"; U.S. patent application Ser. No. 09/423,025 (Peterson, H. L., et al.; filed on Oct. 28, 1999) are incorporated herein by reference in their entirety and for all purposes.

BRIEF DESCRIPTION OF THE DRAWINGS

These, and further features of the invention, may be better understood with reference to the accompanying specification and drawings depicting the preferred embodiment, in which:

FIG. 8 is a flowchart of the interaction of the user with the computer of FIG. 1 in accordance with the method of the present invention;

FIG. 9 is a flow chart of user interaction with the GUI in accordance with the method of the present invention;

FIG. 10 is a flow chart of optional steps that may be performed in various alternate preferred embodiments of the method of the present invention;

FIG. 14 is a process chart of interaction between the computer of FIG. 1 with the remote computer of FIGS. 1 and 13 and the additional computational devices of FIG. 13.

DETAILED DESCRIPTION OF A PREFERRED EMBODIMENT

Figure 1:
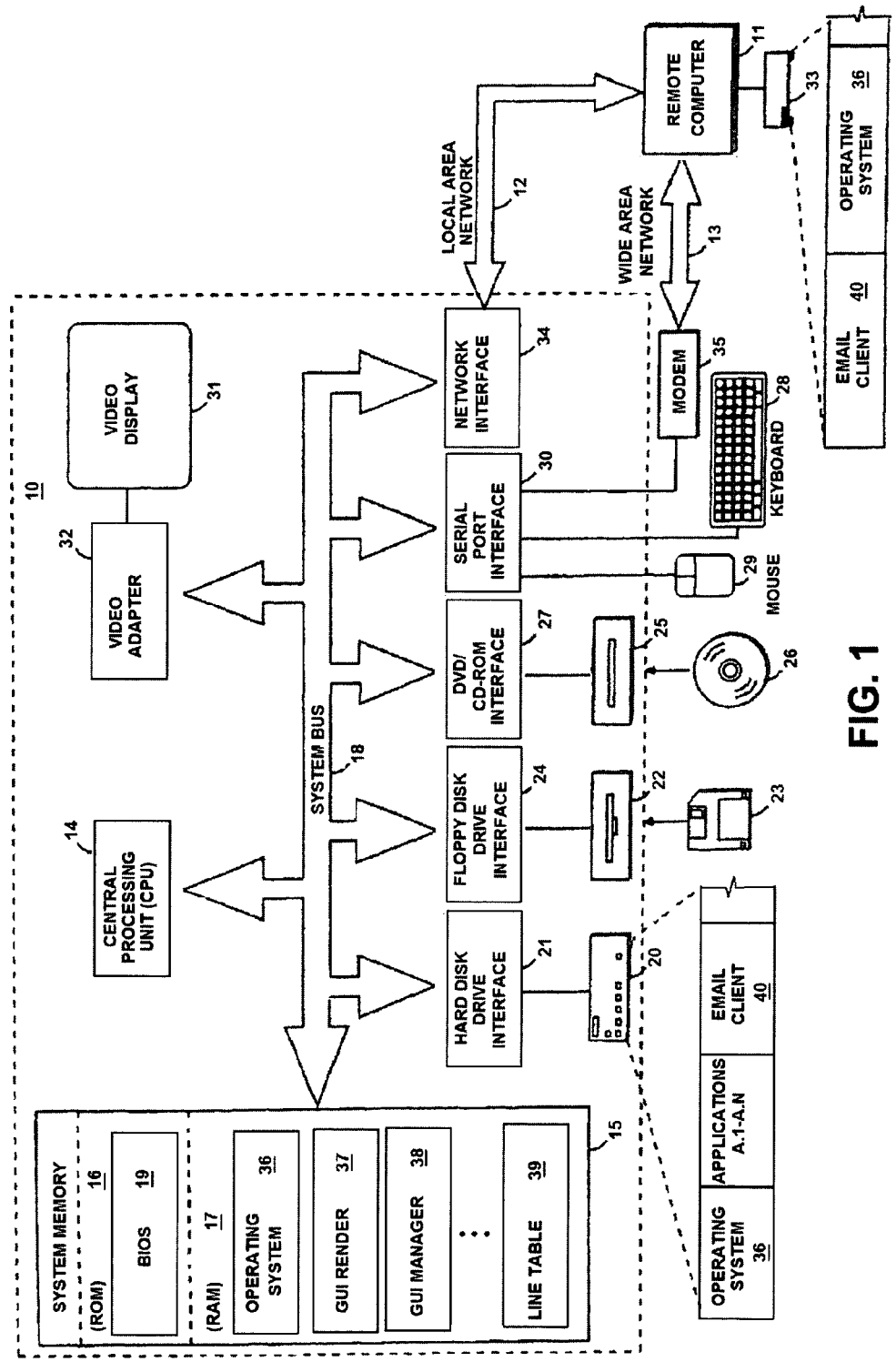
FIG. 1 illustrates a computer suitable for supporting the operation of an exemplary embodiment of the present invention.

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Referring now to the drawings, in which like numerals represent like elements throughout the several figures, aspects of the present invention and the preferred operating environment will be described.

FIG. 1 illustrates various aspects of the preferred computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications. FIG. 1 illustrates a computer 10 suitable for supporting the operation of an exemplary embodiment of the present invention. As shown in FIG. 1, the computer 10 operates in a networked environment with logical connections to a remote computer 11. The logical connections between the computer 10 and the remote computer 11 are represented by a local area network (LAN) 12 and a wide area network (WAN) 13. In this client/server configuration, the remote computer 11 may function as a file server or computer server. It is understood that the WAN 13 may be communicatively coupled with, or comprised within, the Internet.

The computer 10 and/or remote computer 11 may in various alternate preferred embodiments of the method of the present invention be or comprise a computer system, such as (a.) a VAIO FS8900™ notebook computer marketed by Sony Corporation of America, of New York City, N.Y., (b.) a SUN SPARCSERVER™ computer workstation marketed by Sun Microsystems of Santa Clara, Calif. running LINUX™ operating system software or UNIX™ operating system software; (c.) a personal computer configured for running WINDOWS XP™ operating system software or VISTA™ operating system software marketed by Microsoft Corporation of Redmond, Wash.; (d.) a PowerBook G4™ personal computer as marketed by Apple Computer of Cupertino, Calif.; (e.) an IPHONE™ cellular telephone as marketed by Apple Computer of Cupertino, Calif.; or (f.) a personal digital assistant.

The computer 10 includes a central processing unit (CPU) 14, such as a PENTIUM™ microprocessor manufactured by Intel Corporation of Santa Clara, Calif. The personal computer also includes system memory 15 (including read-only memory (ROM) 16 and random access memory (RAM) 17), which is connected to the CPU 14 by a system bus 18. The preferred computer 10 utilizes a BIOS 19, which is stored in ROM 16. Those skilled in the art will recognize that the BIOS 19 are a set of basic routines that helps to transfer information between elements within the computer 10. Those skilled in the art will also appreciate that the present invention may be implemented on computers having other architectures, such as computers that do not use a BIOS, and those that utilize other types of microprocessors. Certain yet additional alternate preferred embodiments of the method of the present invention employ a TrustedCore™ BIOS as marketed by Phoenix Technologies of Milpitas, Calif.

Within the computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A DVD/CD-ROM drive 25, which is used to read a DVD or CD-ROM disk 26, is connected to the system bus 18 via a DVD/CD-ROM interface 27. A user enters commands and information into the computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor C on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, DVD/CD-ROM drive, magneto-optical drive or the like. The computer 10 is connected to the remote computer 11 by a network interface 34, which is used to communicate over the local area network 12.

As shown in FIG. 1, the computer 10 is also connected to the remote computer 11 by a modem 35, which is used to communicate over the wide area network 13, such as the global Internet. The modem 35 is connected to the system bus 18 via the serial port interface 30. The modem 35 also can be connected to the public switched telephone network (PSTN) or community antenna television (CATV) network. Although illustrated in FIG. 1 as external to the computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the computer 10 and the remote computer 11.

Although other internal components of the computer 10 are not shown, those of ordinary skill in the art will appreciate that such components and the interconnection between them are well known, such as methods and devices for enabling wireless communications. Accordingly, additional details concerning the internal construction of the computer 10 need not be disclosed in connection with the present invention.

Those skilled in the art will understand that program modules such as an operating system 36, application programs A.1-A.N, and electronic documents D.1-D.N are provided to the computer 10 via computer-readable media 20, 23 & 28. In the preferred computer, the computer-readable media include the local or remote memory storage devices, which may include the local hard disk drive 20, floppy disk 23, DVD/CD-ROM 26, RAM 17, ROM 16, and the remote memory storage device 33. In the preferred computer 10, the local hard disk drive 20 is used to store data, documents D.1-D.N and programs A.1-A.N. During user operation of the preferred computer 10, data, documents D.1-D.N and programs A.1-A.N can be retrieved from the local hard disk drive 20 and are stored in local memory, such as RAM 17.

Figure 2:
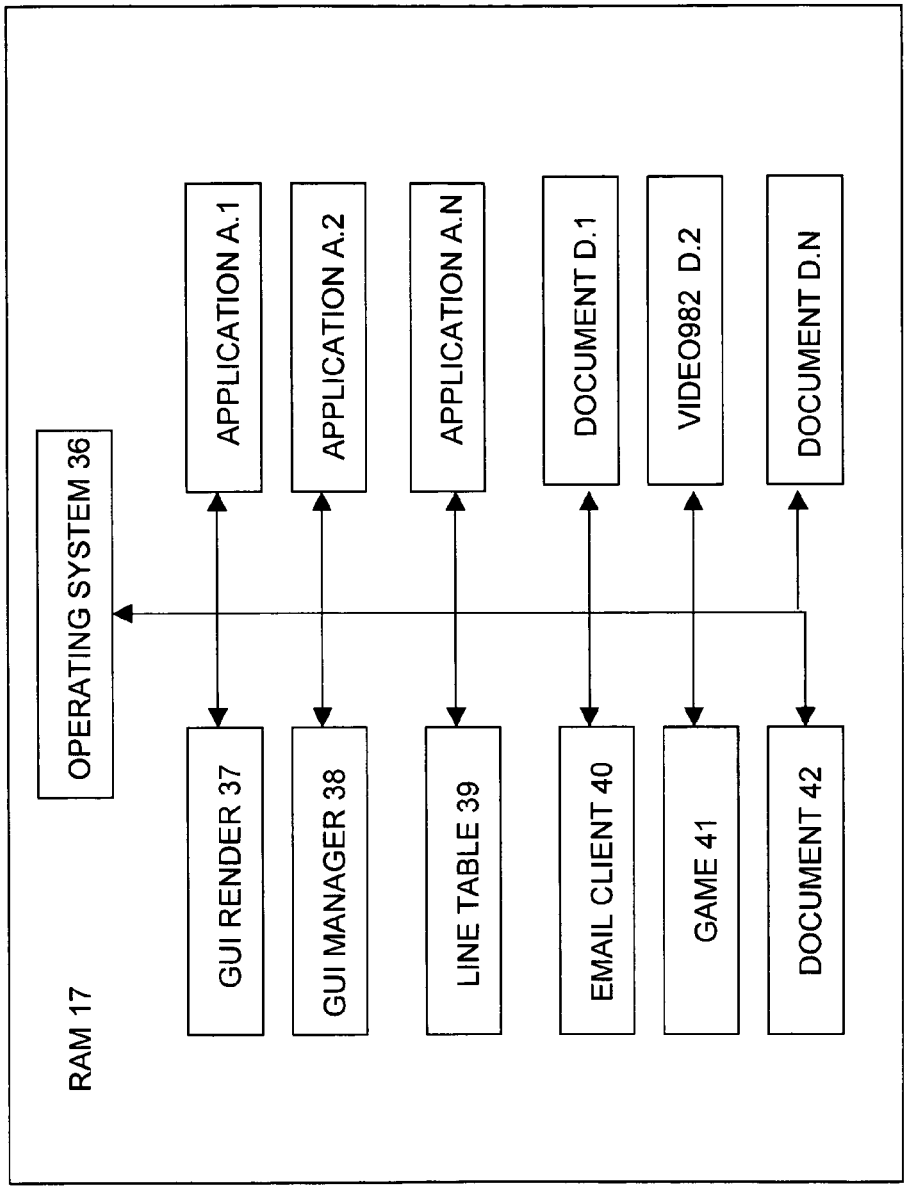
FIG. 2 is a detailed schematic of a random access memory of the computer of FIG. 1.

Referring now generally to the Figures and particularly to FIG. 2, FIG. 2 is a more detailed schematic of RAM 17 illustrating RAM 17 as storing the operating system 36, a GUI rendering module 37, a GUI manager 38, a line table 39, an email client 40, a computer game software 41 (hereafter "game 41"), an electronic document 42 (hereafter "document 42"), the plurality of application software programs A.1-A.N, and the plurality of electronic documents D.1-D.N. The email client software 40 may be a licensed copy of EUDORA™ email software as marketed by QUALCOMM Incorporated of San Diego, Calif. 92121.

It is understood that electronic documents D.1-D.N include word processing documents such as generated by WORD™ word processing software as marketed by Microsoft Corporation of Redmond, Wash., graphic electronic documents as generated by POWERPOINT™ graphics software as marketed by Microsoft Corporation of Redmond, Wash., and other suitable electronic documents known in the art that comprise text, audio, graphics, photographic, and/or video data. In particular, electronic document D.2 comprises a video file VIDEO982.

Figure 3:
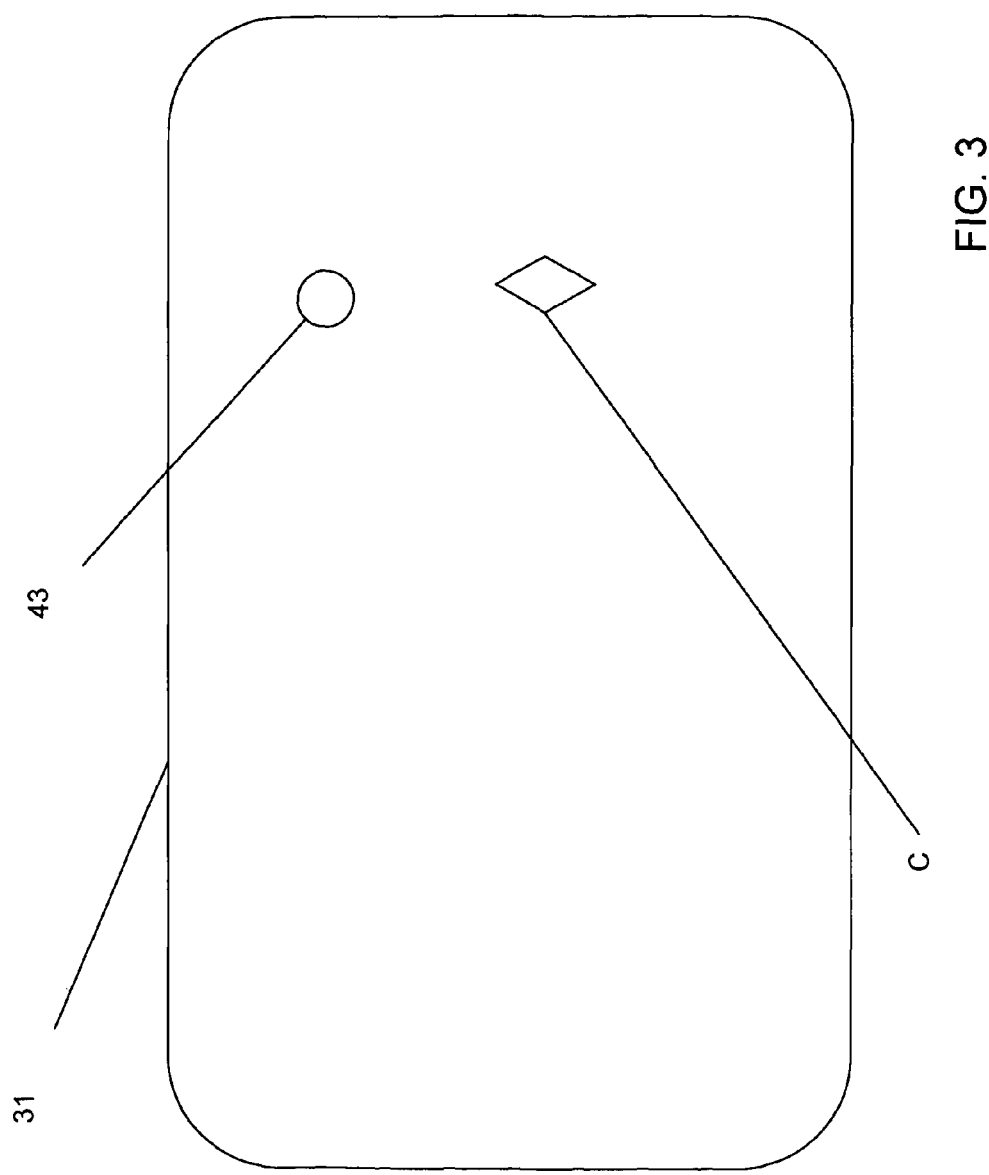
FIG. 3 illustrates a video display of the computer of FIG. 1 visually presenting a primary icon and a cursor.

The GUI rendering module 37, "GUI RENDER 37", reads from the line table 39 and provides information to the CPU 14 and the video adapter 32 to enable the computer 10 to visually present information derived from the line table 39 onto the video display 31. The GUI manager software 38, or GUI MANAGER 38 organizes and maintains the line table 39, to include modifying, adding and deleting information and instructions of the line table 39 that affect the presentation as enabled by the GUI RENDER 37 and the video display 31. Referring now generally to the Figures and particularly to FIG. 3, FIG. 3 illustrates the video display 31 visually presenting a primary icon 43 and the cursor C. The position of the cursor C is controlled by the user by means of manipulating the mouse 29 and/or depressing keys of the keyboard 28. In a first alternate preferred embodiment of the method of the present invention, the primary icon 43 enters into a SELECTION state when the cursor C is placed within a proximity to the primary icon 43. The proximity required to exist between the primary icon 43 and the cursor C is preferably less than 0.5 inch, or more preferably less than 0.25 inch. In yet other alternate preferred embodiments of the method of the present invention, the computer 10 detects that the primary icon has been selected when the cursor C is placed in proximity with the primary icon 43 and the mouse 29 simultaneously transmits a selection command by means of (a.) receipt of a mouse click signal, or (b.) a selection signal from the keyboard 28.

The surface are of the primary icon 43 as presented on the video display screen is preferably within the range of 0.00001 square inch and 0.001 square inch, and more preferably in the range of 001 square inch and 0.01 square inch. In certain yet alternate preferred embodiments of the method of the present invention the surface area, color and brightness of the primary icon 43 may be varied by user commands as applied by the GUI MANAGER 38.

Figure 4:
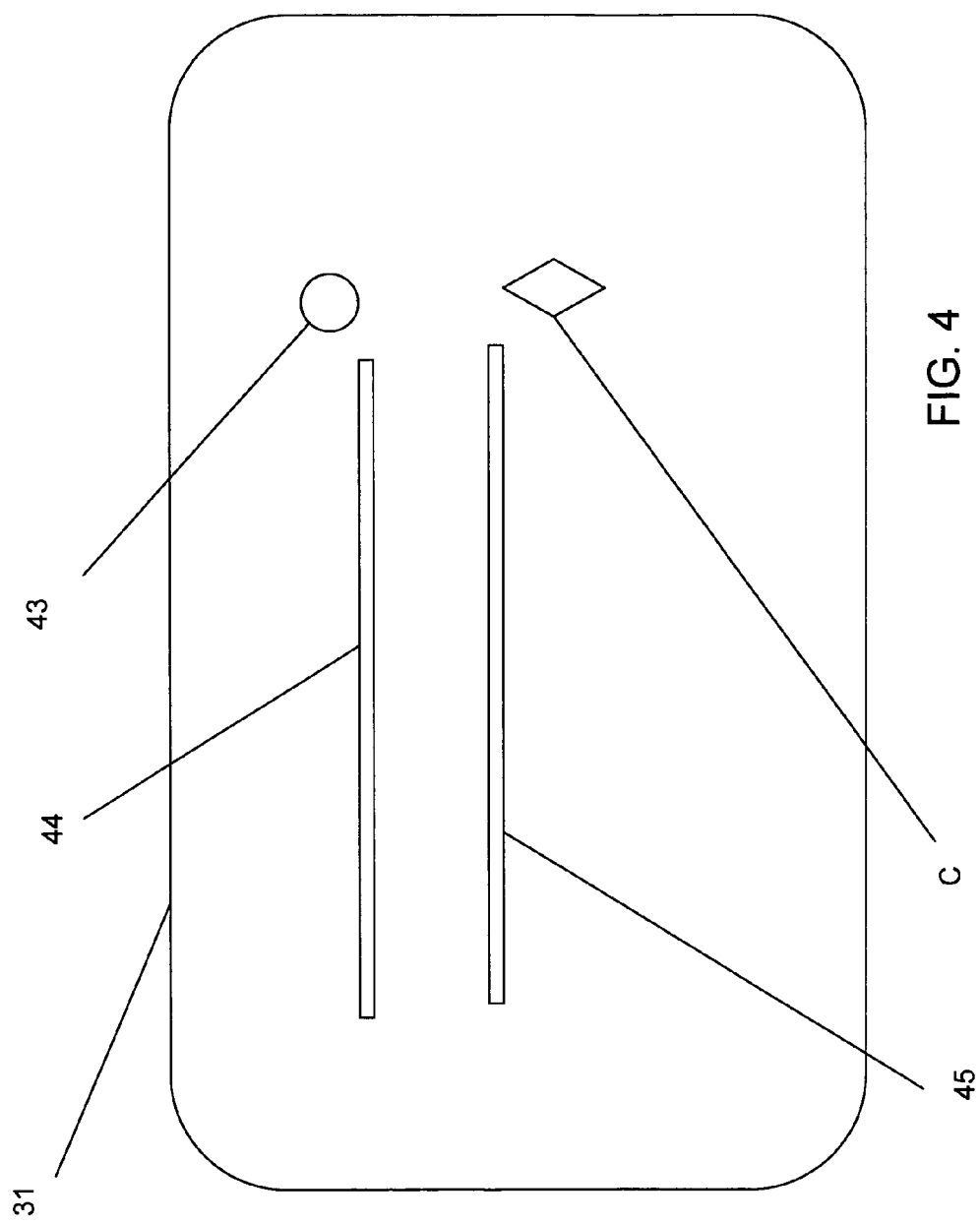
FIG. 4 illustrates the video display of FIGS. 1 and 3 visually presenting the primary icon and the cursor of FIG. 3, a first line icon and a second line icon.

Referring now generally to the Figures and particularly to FIG. 4, FIG. 4 illustrates the video display 31 visually presenting the primary icon 43, the cursor C, a first line icon 44 and a second line icon 45. As discussed herein, the first line icon 44 and optionally the second line icon 45 are rendered when the computer 10 detects that the primary icon 43 has been selected.

Figure 5:
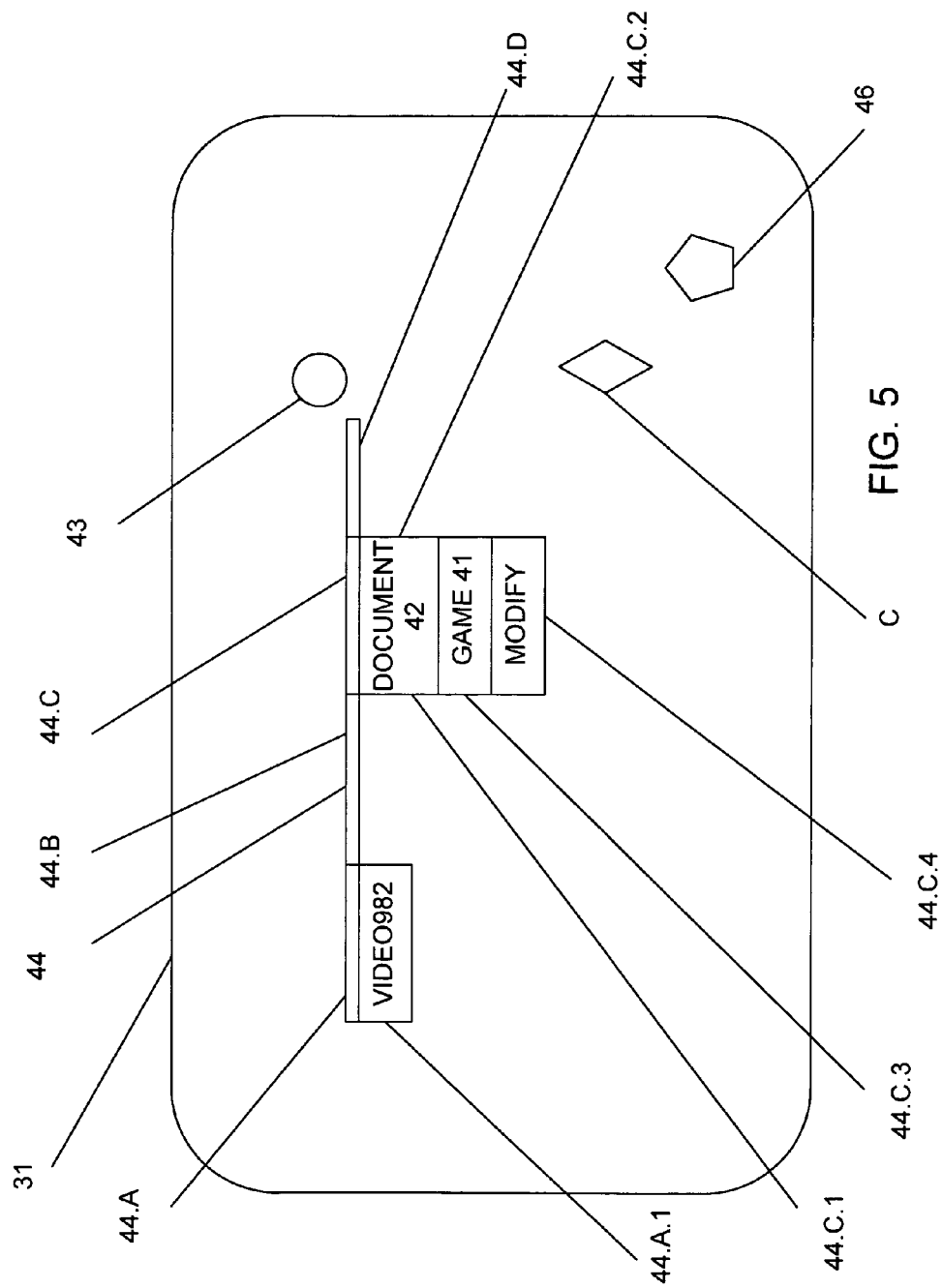
FIG. 5 illustrates the video display of FIGS. 1, 3 and 4 visually presenting the primary icon, the cursor, and a plurality of line segments of the first line icon of FIG. 4.

Referring now generally to the Figures and particularly to FIG. 5, FIG. 5 illustrates the video display 31 visually presenting the primary icon 43, the cursor C, and line segments 44.A-44.D of the first line icon 44. A first segment 44.A is associated with the second electronic document D.2 and when selected displays a first drop down display and selection field 44A.1. The display and selection 44.A.1 enables the user to direct the computer 10 to render the video file VIDEO982 by means of a video rendering application A.N of the computer 10. The user sends the command to render the video file VIDEO982 by selecting the displayed field presenting the text VIDEO982 by means of positioning the cursor C proximate to the display and selection filed 44.A.1 and then sending selection command by means of the mouse 29 and/or the keyboard 28.

A second line segment 44.B is shown in an unselected state and without a drop down menu displayed.

A third line segment 44.C is illustrated in a selected state and presents a third dropdown menu 44.C.1 having a plurality of display and selection fields 44.C.2-44.C.4. A first display and selection field 44.C.2 is associated with the document 42 and enables the actuation of an applications program A.1-A.N to visually render the document 42. A second display and selection field 44.C.3 is associated with the game 41 and enables the actuation of an applications program A.1-A.N to visually and render the game.

A third display and selection field 44.C.4 is associated with the GUI MANAGER 38 and enables the actuation of the GUI MANAGER 38 to modify the content, visual display, audio content and associations of the first line icon 44.A, to include the contents of the line segments 44.A-44.D.

It is understood that the cursor C may be used in conjunction with the mouse 29 and/or the keyboard 28 to direct the computer 10 to (a.) remove of a line segment from a line icon 44 or 45, (b.) create a new line with a content 41, 42 of a selected line segment, and/or (c.) for copying and inclusion as an attachment to an email or other electronic communication to be sent to the remote computer 11.

A fourth line segment 44.D is shown in an unselected state and without a drop down menu displayed.

Figure 6:
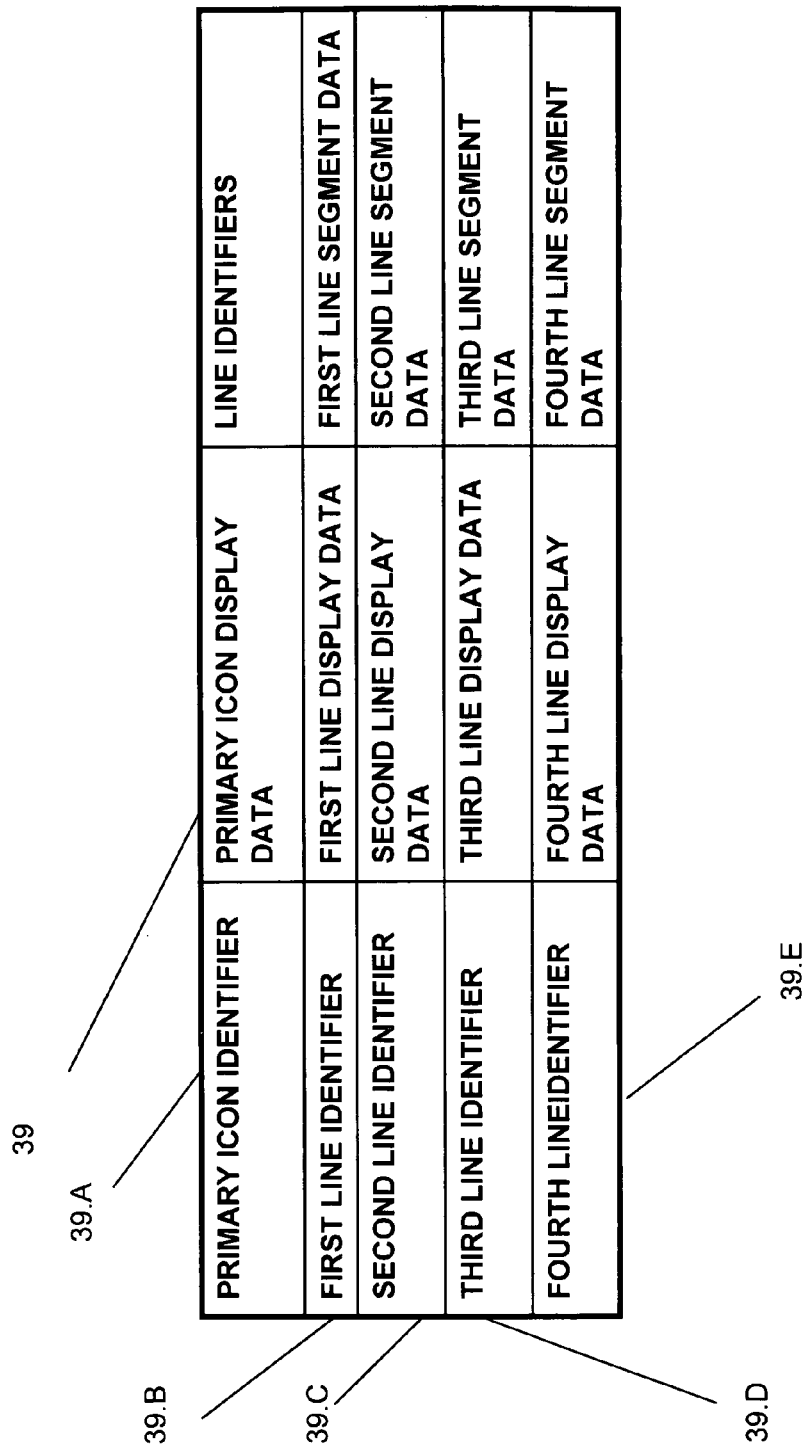
FIG. 6 is a schematic diagram of exemplary informational content of the line table of FIG. 1.

Referring now generally to the Figures and particularly to FIG. 6, FIG. 6 is a schematic diagram of exemplary informational content of the line table 39, that includes a primary icon information 39.A, and a plurality of line icon information 39.B-39.E. The primary icon information includes (a.) a primary icon identifier, (b.) primary icon display data that informs the computer 10 on how to render the primary icon 43, and (c.) one or more line identifiers that identify which line icons 44 & 45 are to be rendered upon selection by the user of the primary icon 43.

Each line icon information 39.B-39.E includes a (a.) unique and distinguishing line icon identifier, (b.) line icon display data that informs the computer 10 on how to render the instant line icon 44 or 45, and (c.) one or more segment data that identify the electronic content D.1-D.N, A.1-A.N that is made available for rendering by means of selection of segments 44.A-44.D of the line icons 44 & 45.

Figures 7A, 7B:
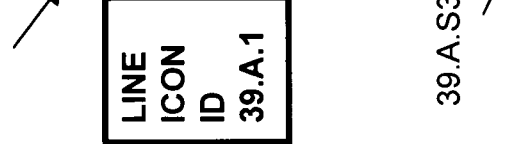
FIG. 7A is a schematic of an exemplary line icon information configured for rendering a line icon of FIGS. 4 and 5.
FIG. 7B is a schematic of an exemplary third segment data set configured to enable a rendering of a line segment of FIG. 5.

Referring now generally to the Figures and particularly to FIGS. 7A and 7B, FIG. 7A is a schematic of an exemplary line icon information 39.A containing a line icon identifier 39.A.1 that uniquely identifies the exemplary line icon 39.A to the CPU 14, the GUI RENDER 37 and the GUI MANAGER 38. A line information display data 39.A.2 informs the GUI RENDER 37 how to visually present the line icon 39A on the video screen 31. The segment data sets 39.A.S1-39.A.SN contain information used by the GUI RENDER 37 how to render line segments 44.A-44.D on the video display 31 and what applications A.1-A.N and/or documents D.1-D.N to associate with each line segment 44.A-44.D.

Referring now generally to the Figures and particularly to FIG. 7B, FIG. 7B is a schematic of an exemplary third segment data set 39.A.S3 that informs the GUI RENDER 37 how to render the third line segment 44.C on the video display 31 and what applications A.1-A.N and/or documents D.1-D.N to associate with the third line segment 44.C. The containing third segment data set 39.A.S3 includes a segment identifier 39.A.S3.1 that uniquely identifies the third line segment 44.C to the CPU 14, the GUI RENDER 37 and the GUI MANAGER 38. A third segment display data 39.A.S3.2 further informs the GUI RENDER 37 how to visually present the line segment 44.C on the video screen 31, to include instructions regarding how to visually display the drop down menu 44.C.1. An optional third segment audio data 39.A.S3.3 optionally provide audio data for rendering in association with a visual rendering of the third segment 44.C. A third segment customize data 39.A.S3.4 informs the GUI RENDER 37 of any customization of the rendering of the third line segment 44.C as directed by the user by means of the GUI MANAGER 38. A third pointer field 39.A.S3.5 containers pointers to documents D.1-D.N and/or applications A.1-A.N that are associated with the third line segment 44.C, and may be actuated, I.e. rendered, executed, instantiated, launched or ran, by user selection of the drop down menu 44.C.1 of the third line segment 44.C. The pointers of the third pointer field 39.A.3.5 reference addresses of the system memory 15, the hard disk drive 20, the floppy disk 23 and/the electronic media 26, wherefrom selected documents D.1-D.N and/or applications A.1-A.N may be actuated, i.e., rendered, displayed, instantiated, executed, launched, relaunched and/or ran.

Referring generally to the Figures and particularly to FIG. 8, FIG. 8 is a flowchart of the interaction of the user with the computer 10 in accordance with the method of the present invention. In step 8.2 the computer 10 determines whether the user has positioned the cursor C proximate to the primary icon 43, or used the mouse 29 to transmit a selection by transmission of a click command to the computer 10, and to direct the computer 10 to display one or more line icons 44 & 45. When the computer 10 interprets the position of the cursor C, or information received from the mouse 29, as an affirmative actuation command, the computer proceeds from step 8.2 to step 8.4 and renders the line icons 44 & 45 in step 8.4. Audio data stored in the line table 39 and associated with the line icons 44 & 45 may optionally be rendered in step 8.6. The computer 10 determines in step 8.8 whether the position of the cursor C or commands received from the mouse 29 indicate that a line segment 44.A-44.D shall be actuated, as per FIG. 9.

When the computer 10 determines in step 8.8 that the position of the cursor C or commands received from the mouse 29 do not indicate that a line segment 44.A-44.D shall not be presently actuated, the computer 10 proceeds from step 8.8 to step 8.12. The computer 10 determines in step 8.12 whether the position of the cursor C or commands received from the mouse 29 indicate that a line icon 44 or 45 shall be closed. When the computer 10 determines in step 8.12 that the position of the cursor C or commands received from the mouse 29 indicate that a line icon 44 or 45 shall be closed, the computer 10 proceeds from step 8.12 to step 8.14 and to close the line icons 44 & 45 and cease rendering the line icons 44 & 45 on the video display 31. The computer 10 proceeds from step 8.14 to perform alternate processing.

Referring generally to the Figures and particularly to FIG. 9, FIG. 9 is a flow chart of user interaction with the invented GUI, wherein the drop down menu 44.C.1 is displayed on the video screen 31 in step 9.2. The computer 10 determines in step 9.4 whether the position of the cursor C, or commands received from the mouse 29 and/or keyboard 28 indicate that a document D.1-D.N or application A.1-A.N associated with the drop down menu 44.C.1 shall be actuated, I.e., rendered, displayed, instantiated, executed, launched or ran. A document D.1-D.N or an application A.1-A.N selected in step 9.4 is actuated, i.e., rendered or displayed on the display 31. The computer 10 proceeds from step 9.6 or step 9.4 to step 9.8 and to execute step 8.8.

Referring generally to the Figures and particularly to FIG. 10, FIG. 10 is a flow chart of optional steps that may be performed in various alternate preferred embodiments of the method of the present invention. In step 10.02 the computer 10 determines whether the user is directing an actuation of a document D.1-D.N or an application A.1-A.N, and a document D.1-D.N or an application A.1-A.N selected in step 10.2 is actuated. The determination of step 10.2 is made by the computer 10 on the basis of the position of the cursor C and/or commands received from the mouse 29 and/or keyboard 28.

The computer 10 determines under in step 10.06, as directed by the user, whether to actuate the GUI MANAGER 38 to modify or customize a line icon 44 or 45, and in step 10.8 the GUI MANAGER 38 modifies a selected line icon 44 or 45 or line segment 44.A-44.D as directed by the user.

The computer 10 determines in step 10.10 whether the position of the cursor C or commands received from the mouse 29 and/or keyboard 28 directs the computer 10 to copy a document D.1-D.N or an application A.1-A.N into a target. It is understood that the target receiving a copy of the selected document D.1-D.N or application A.1-A.N may be an email document, a computer-readable media 23 or 26. In step 10.12 the computer writes a copy of the selected document D.1-D.N or application A.1-A.N into the selected target.

The computer 10 determines in step 10.14 whether the position of the cursor C or commands received from the mouse 29 and/or keyboard 28 directs the computer 10 to close a selected line icon 44 or 45, or a line segment 44.A-44.D. The computer 10 closes a selected line icon 44 or 45 or line segment 44.A-44.D in step 10.16. The computer 10 proceeds from step 10.16 to step 10.18 and therefrom to return to step 8.12. Alternatively, when computer 10 determines in step 10.14 that the position of the cursor C or commands received from the mouse 29 and/or keyboard 28 do not direct the computer 10 to close a selected line icon 44 or 45, or a line segment 44.A-44.D, the computer 10 process from step 10.14 to perform alternate computational processing in step 10.20.

Figure 11:
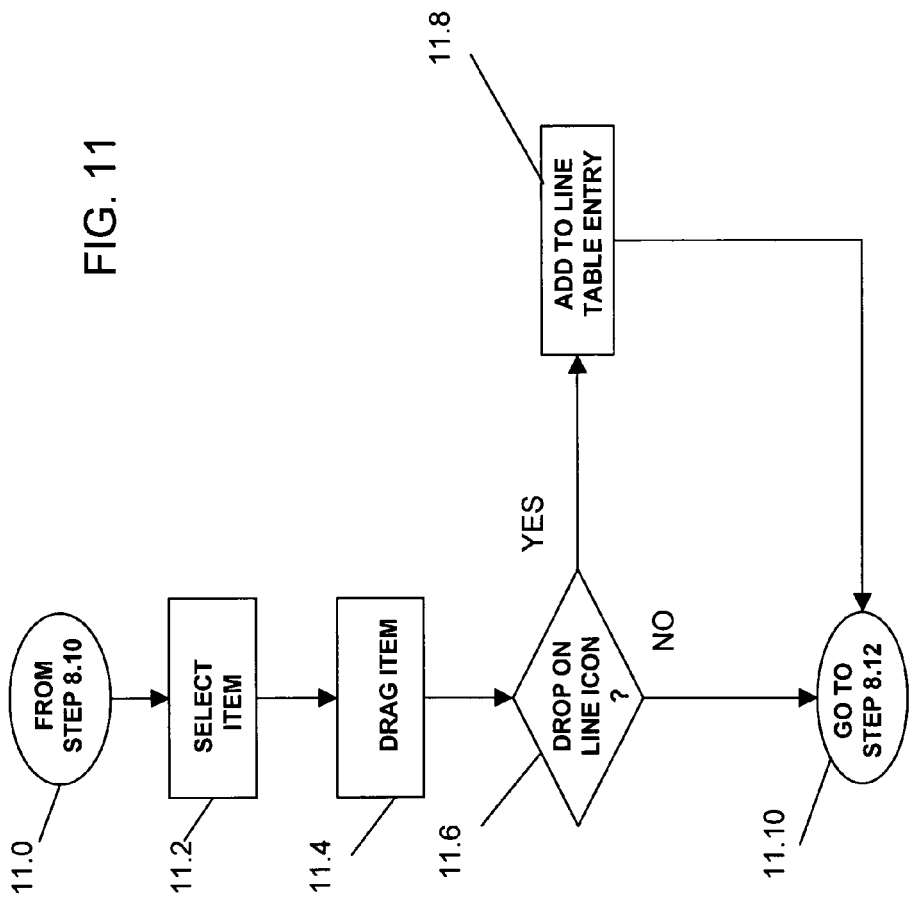
FIG. 11 is a flowchart of the GUI manager of FIG. 1 as directed by the user to add a new reference of a document or an application to a selected line segment of FIG. 5.

Referring generally to the Figures and particularly to FIG. 11, FIG. 11 is a flowchart of the GUI MANAGER 38 directed by the user to add a new reference of a document D.1-D.N or an application A.1-A.N to a selected line segment 44.A-44.D. The user selects a visual icon 46 (see FIG. 5) of a document D.1-D.N or an application A.1-A.N as presented on the video screen 31 in step 11.2 with the mouse 29, and then further uses the mouse 29 in step 11.4 to drags and drops the selected icon 46 onto a line segment 44.A-44.N. The computer 10 determines in step 11.6 whether information received from the mouse 29 indicates that the visual icon 46 has been dropped into the selected line segment 44.A-44.D, and the GUI MANAGER 38 modifies the line table 39 in step 11.8 to include add a point and display information to the receiving line segment 44.A-44.D detected in step 11.6. The computer 10 proceeds from step 11.6 or 11.8 to step 11.10 and therefrom to return to step 8.12.

Figure 12:
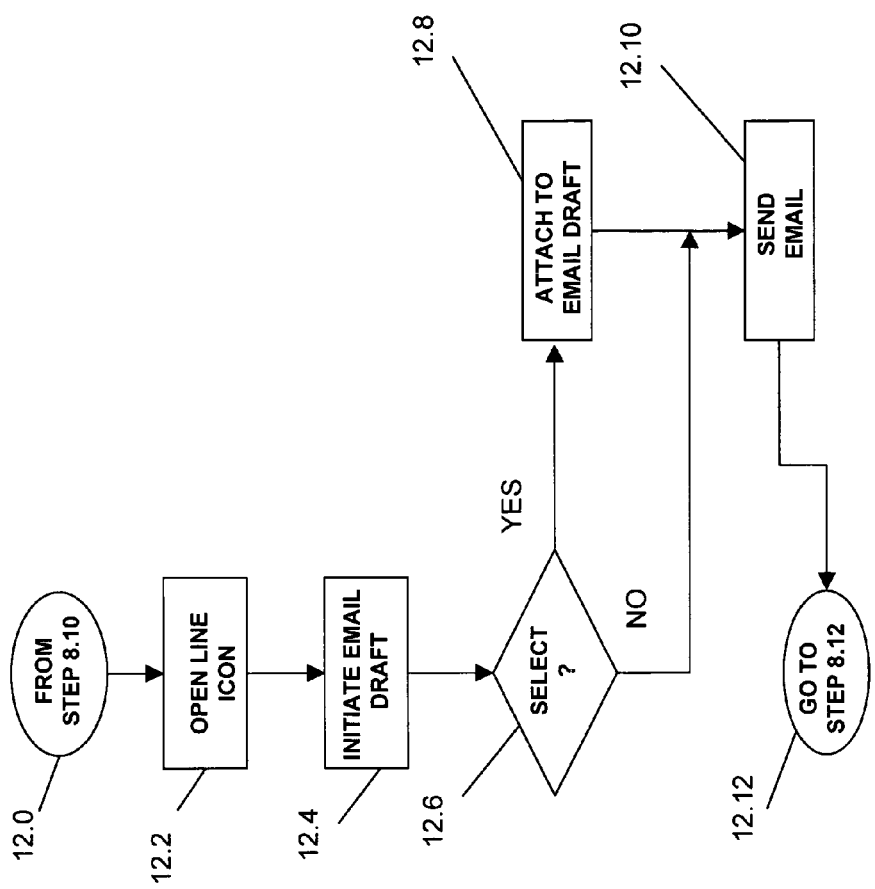
FIG. 12 is a flowchart of an exemplary process for selecting and attaching a document or an application of FIG. 1, or a line icon of FIGS. 4 and 5, or a line segment of FIG. 5 to an email for transmission from the computer to the remote computer of FIG. 1.

Referring generally to the Figures and particularly to FIG. 12, FIG. 12 is a flowchart of an exemplary process for selecting and attaching a document D.1-D.N to an email for transmission from the computer 10 to the remote computer 11. In step 12.2 the user open's a segment of a line icon, and initiates an email draft in step 12.4. The user selects an entire line icon 44 or 45, one or more line segments 44.A-44.D, one or more documents D.1-D.N and/or one or more applications A.1-A.N in step 12.6. In step 12.8 one or more line icon 44 or 45, line segment 44.A-44.D, documents D.1-D.N and/or A.1-A.N selected in step 12.6 are attached to the email draft initiated in step 12.4, and the user directs the email client 40 to send the email with the electronic information selected in step 12.6. The computer 10 proceeds form step 12.10 to step 12.12 and to return to step 8.12.

It is understood that the execution of steps 12.2-12.10 are accomplished under user direction of, and interaction with, the email client 40.

The computer-readable medium 23 or 26 may comprise machine-readable instructions which when executed by the computer to cause the computer 10 to perform one or more steps as described in the Figures and enabled by the present disclosure.

The term "computer-readable medium" as used herein refers to any suitable medium known in the art that participates in providing instructions to the network for execution. Such a medium may take many forms, including but not limited to, non-volatile media, volatile media, and transmission media. Non-volatile media includes, for example, optical or magnetic disks, tapes and thumb drives. Volatile media includes dynamic memory. Transmission media includes coaxial cables, copper wire and fiber optics. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, RAM, a PROM, and EPROM, a FLASH-EPROM, any other memory chip or cartridge, a carrier wave as described hereinafter, or any other suitable medium known in the art from which a computer can read machine executable instructions.

Various forms of computer readable media may be involved in carrying one or more sequences of one or more instructions to the network for execution. For example, the instructions may initially be carried on a magnetic disk of a remote computer. The remote computer can load the instructions into its dynamic solid-state electronic memory 8 and send the instructions over a telephone line using a modem. A modem 35 local to or communicatively linked with the network can receive the data on the telephone line and use an infra-red transmitter to convert the data to an infra-red signal.

In view of the foregoing, it will be understood that the present invention is directed to a computer-implemented method for interactively presenting media items associated with an electronic content presentation, such as a graphical user interface (GUI), via an output device. A determination is made whether a position indicator or pointer, such as the cursor C, is located proximate to a GUI location that is associated with supplemental content in the form of a media item. If so, an indicator is presented to advise the user that supplemental content is indeed associated with that location on the interface. For example, a media icon representing one or more media items can be displayed on the output device proximate to the location of the input device indicator. This indicator serves as a prompt or cue for the user to select the indicator if the user desires to review the supplemental content. A determination is made whether the media icon has been selected in response to an input signal issued by an input device. If so, the selected media item, typically video and/or audio information, is presented to the user via the output device.

Figure 13:
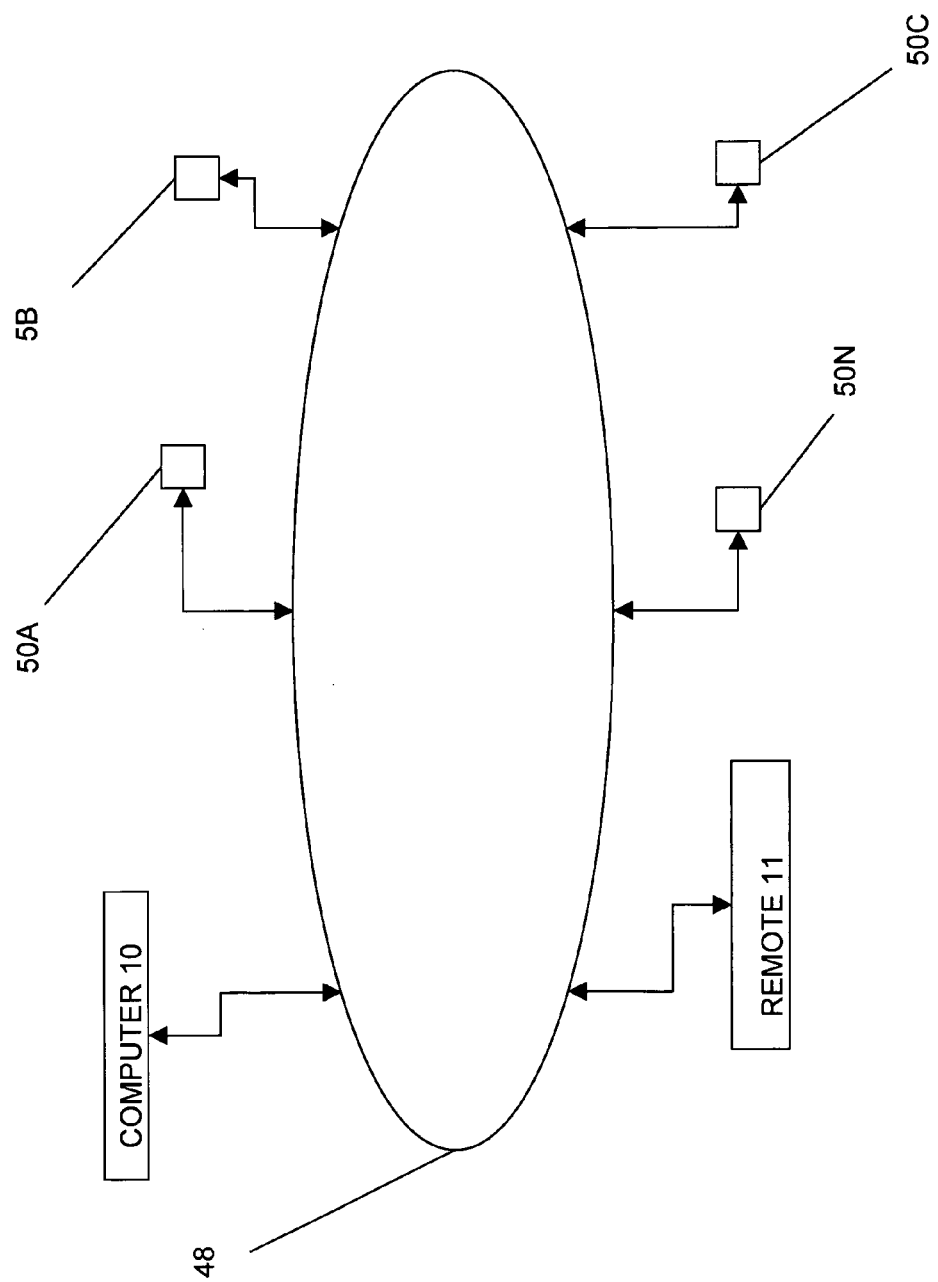
FIG. 13 is a schematic of an alternate electronics communications network that bi-directionally communicatively couples the computer and the remote computer of FIG. 1 with a plurality of additional computational devices.

Referring now generally to the Figures and particularly to FIG. 13, FIG. 13 is a schematic of an alternate electronics communications network 48 that bi-directionally communicatively couples the computer 10, the remote computer 11, and a plurality of additional computational devices 50A-50X. One or more additional computational devices 50A-50X may be or comprise a network enabled computational device, such as (a.) a VAIO FS8900™ notebook computer marketed by Sony Corporation of America, of New York City, N.Y., (b.) a SUN SPARCSERVER™ computer workstation marketed by Sun Microsystems of Santa Clara, Calif. running LINUX™ operating system software or UNIX™ operating system software; (c.) a personal computer configured for running WINDOWS XP™ operating system software or VISTA™ operating system software marketed by Microsoft Corporation of Redmond, Wash.; (d.) a PowerBook G4™ personal computer as marketed by Apple Computer of Cupertino, Calif.; (e.) an IPHONE™ cellular telephone as marketed by Apple Computer of Cupertino, Calif.; or (f.) a network enabled personal digital assistant.

The alternate electronics communications network 48 may be or comprise the Internet, an intranet, an extranet, a computer network, a telephony network, a wireless telephony network and/or a wireless communications network. The alternate electronics communications network 48 enables the computer 10 to transfer copies of software code stored within the RAM 17 or the information storage devices 20, 23 and 26, including copies of the line table 39, the GUI RENDER 37, the GUI MANAGER 38, applications 40, 41, A.1-A.N and/or documents D.1-D.N, 42, optionally to the remote computer 11 and the additional computational devices 50A-50X.

Referring now generally to the Figures and particularly to FIG. 14, FIG. 14 is a process chart of interaction between the computer of FIG. 1 with the remote computer of FIGS. 1 and 13 and the additional computational devices of FIG. 13. The computer 10 detects in step 14.2 whether the remote computer 11 or an additional computational device 50A-50N is bi-directionally communicatively coupled with the computer 10 via the alternate network 48. When the computer 10 does not detect a communicatively accessible computer 11, 50A-50N in step 14.2, the computer 10 proceeds from step 14.2 to step 14.4 and to perform alternate computational processing. It is understood that the computer 10 may return to step 14.0 in as a periodic check or an event driven process to search for accessible computers 11, 50A-50N in a routine, preprogrammed and/or command-driven process.

When the computer 10 does detect a communicatively accessible computer 11, 50A-50N in step 14.2, the computer 10 proceeds from step 14.2 to step 14.6 and to determine whether a selected computer 11, 50A-50N authorizes a download from the computer 10 via the alternate network 48 of software code that enables one or more aspects of the method of the present invention. In particular, the computer 10 determines in step 14.6 whether the selected computer 11, 50A-50N authorizes a download of the GUI RENDER 37, the GUI Manager 38, and/or the line table 39. In step 14.8 the computer 10 copies and transfers software code as authorized in step 14.6 via the alternate network 48 to the computer 11, 50A-50N detected and selected in step 14.2

The computer 10 determines in step 14.10 whether the selected computer 11, 50A-50N of step 14.2 authorizes a download from the computer 10 via the alternate network 48 of a document 42, D.1-D.N and/or an application 40, 41, A.1-A.N. In step 14.12 the computer 10 copies and transfers software code as authorized in step 14.10 via the alternate network 48 to the computer 11, 50A-50N detected and selected in step 14.2.

The computer 10 determines in step 14.14 whether to return to step 14.2 to search for an additional computational device 11, 50A-50N that is bi-directionally communicatively coupled with the alternate network 50.

The present invention has been described above in relation to particular embodiments that are intended to be illustrative rather than restrictive. The particular embodiments described involve the use of a geographic electronic map. However, those skilled in the art will understand that the principles of the present invention apply to any task or process that requires interactivity between with an electronic content display and content items associated with locations for that content display. Alternative embodiments will become apparent to those skilled in the art to whom the present invention without departing from its spirit and scope. Accordingly, the appended claims rather than the foregoing description define the scope of the present invention.

We claim:

1. In a computer comprising a video display and a selection device, a method for actuating a graphical user interface ("GUI"), comprising:

associating a visual selection button exclusively with a continuous line icon comprising a plurality of contiguous linear GUI elements including a first linear GUI element and a second GUI element, wherein the plurality of contiguous linear GUI elements are presented within the continuous line icon upon selection of the selection button, wherein the plurality of linear GUI elements are sequentially linearly ordered and contiguously positioned and adjoined within the continuous line icon and form at least one border shared between two adjacent linear GUI elements;

presenting the visual selection button on the video display, the visual selection button having a minimal nonrectangular visual display area of the video display;

detecting of a positioning of a cursor proximate to the visual selection button as directed by input from the selection device;

interpreting the proximate positioning of the cursor to the visual selection button as a first selection command of the visual selection button;

rendering the continuous line icon upon receipt of the first selection command of the selection button from the selection device, wherein the visual selection button is non-contiguous with the rendered continuous line icon;

detecting of a positioning of the cursor proximate to the first linear GUI element as directed by input from the selection device;

interpreting the proximate positioning of the cursor proximate to the first linear GUI element as a second selection command, wherein the second selection command is referenced to the first linear GUI element; and launching an application associated with the first linear GUI element upon receipt of the second selection command of the first linear GUI element from the selection device, whereby the application is launched in a process requiring only two actions by a user.

2. The method of claim 1, wherein the linear GUI element is rendered at a minimal height as enabled by the computer.

3. The method of claim 1, wherein the visual selection button is adapted by a user to occupy an area of the display screen larger than the minimal display area of the video display.

4. In a computer comprising a video display and a selection device, a method for actuating a graphical user interface ("GUI"), comprising:
 associating a visual selection button exclusively with a continuous line icon;
 presenting the visual selection button on the video display as a nonrectangular image and non-contiguously from the continuous line icon;
 detecting of a positioning of a cursor proximate to the visual selection button as directed by input from the selection device;
 interpreting the proximate positioning of the cursor to the visual selection button as a first selection command of the visual selection button;
 rendering the continuous line icon presenting at least a first GUI string element and a second GUI string element upon receipt of the first selection command of the selection button from the selection device, the second GUI string element positioned laterally relative to the first GUI string element, wherein a plurality of GUI string elements comprising the first GUI string element and the second GUI element are presented within the continuous line icon upon selection of the selection button, wherein the plurality of GUI string elements are sequentially linearly ordered and contiguously positioned and adjoined within the continuous line icon and form at least one border shared between two adjacent GUI string elements;
 detecting of a positioning of the cursor proximate to the first GUI string element as directed by input from the selection device;
 interpreting the proximate positioning of the cursor proximate to the first GUI string element as a second selection command, wherein the second selection command is referenced to the first GUI string element; and
 launching at least one drop down menu upon receipt of the second selection command of the first GUI string element from the selection device, whereby the at least one drop down menu is launched in a process requiring only two actions by a user.

5. The method of claim 4, wherein the visual selection button has a minimal area of the display screen.

6. The method of claim 4, wherein a size of the displayed area of the selection button is programmable by a user.

7. The method of claim 4, wherein at least one presented GUI string element is enabled with at least one drop down menu having a single activation selection.

8. The method of claim 7, wherein each GUI string element is actuated upon separate selection.

9. The method of claim 4, wherein at least one GUI string element is displayed in a prespecified color.

10. The method of claim 9, wherein the prespecified color is selected by a user.

11. The method of claim 4, wherein at least one GUI string element is associated with an audio data, and the audio data is rendered upon proximate positioning of a cursor driven by the selection device.

12. The method of claim 11, wherein the audio data is selected and associated with the at least one GUI string element by a user.

13. The method of claim 4, wherein at least one document is associated with the at least one GUI string element.

14. The method of claim 13, wherein an open condition of the at least one document is indicated by a visual quality of the associated at least one GUI string element.

15. The method of claim 13, wherein the computer is bi-directionally communicatively coupled with an electronics communications network, and the method further comprises selecting the at least one document and transmitting the at least one document from the computer to the electronics communications network.

16. The method of claim 15, wherein the electronics communications network is the Internet.

17. The method of claim 16, wherein the at least one document is transmitted as an email attachment.

18. A computer having a video display, comprising:
 a video display;
 means for visually rendering a selection button, the selection button presenting a minimal nonrectangular visual display area of the video display;
 means for visually rendering a continuous line icon within the video display, the continuous line icon presenting a first GUI string element and a second GUI string element upon user selection of the selection button;
 means for associating an applications program with the first GUI string element;
 means for detecting of a positioning of a cursor proximate to the rendered visual selection button as directed by input from the selection device;
 means for interpreting the proximate positioning of the cursor to the rendered visual selection button as a first selection command of the visual selection button;
 means for rendering the continuous line icon upon receipt of the first selection command of the selection button from the selection device, wherein the visual selection button is non-contiguous with the rendered continuous line icon;
 means for rendering a plurality of GUI string elements comprising the first GUI string element and the second GUI element presented within the continuous line icon upon selection of the selection button, wherein the plurality of GUI string elements are sequentially linearly ordered and contiguously positioned and adjoined within the continuous line icon and form at least one border shared between two adjacent GUI string elements;
 means for detecting of a positioning of the cursor proximate to the rendered first linear GUI element as directed by input from the selection device;
 means for interpreting the proximate positioning of the cursor proximate to the rendered first linear GUI element as a second selection command, wherein the second selection command is referenced to the first linear GUI element; and
 means for launching the application program associated with the first linear GUI element upon receipt of the second selection command of the first linear GUI element from the selection device, whereby the application program is launched in a process requiring only two actions by a user.

* * * * *